Feb. 9, 1971   L. F. RUDOLPH   3,561,860

VIEWING APPARATUS

Filed May 16, 1969   2 Sheets-Sheet 1

Leonard F. Rudolph
INVENTOR

BY: _____ ATTORNEY
    _____ AGENT

Feb. 9, 1971   L. F. RUDOLPH   3,561,860
VIEWING APPARATUS

Filed May 16, 1969   2 Sheets-Sheet 2

Leonard F. Rudolph
INVENTOR

BY: _____
ATTORNEY
George L. Brehm
AGENT

United States Patent Office 3,561,860
Patented Feb. 9, 1971

3,561,860
VIEWING APPARATUS
Leonard F. Rudolph, 6600 Vincent Lane,
Baltimore, Md. 21215
Filed May 16, 1969, Ser. No. 825,282
Int. Cl. G03b 21/28
U.S. Cl. 353—77                                 2 Claims

ABSTRACT OF THE DISCLOSURE

An enclosed viewing apparatus having a cabinet and a screen positioned on one side thereof, and an extended portion about the screen area having a recessed portion under the screen, the screen being provided with a light filter positioned at the extended portion to take away the glare that may come from the screen having means within the enclosure for reflecting images upon the screen at predetermined intervals.

---

This invention relates to reproduction of images on a transparent screen and in particular to reproducing the images from slides and/or tapes with or without sound.

Heretofore there have been a number of image reproducing devices available, some are of the stationary type and some of the portable type. However, their construction is very exacting having no provisions for adjusting the essential elements for producing the image on the screen in its best presentation.

It is accordingly an object of the invention to produce a visual viewing apparatus which will present an image in its most favorable light.

Another object of the invention is to produce such a visual viewing apparatus with a minimum of moving parts and yet provide enough adjustment to the essential elements to take care of presenting the picture on the screen in all its proper aspects.

With these and other objects in view the invention will become more apparent as its nature is more fully understood which will appear as the description proceeds and reference is had to the accompanying drawings forming a part of this specification.

Figure 1:
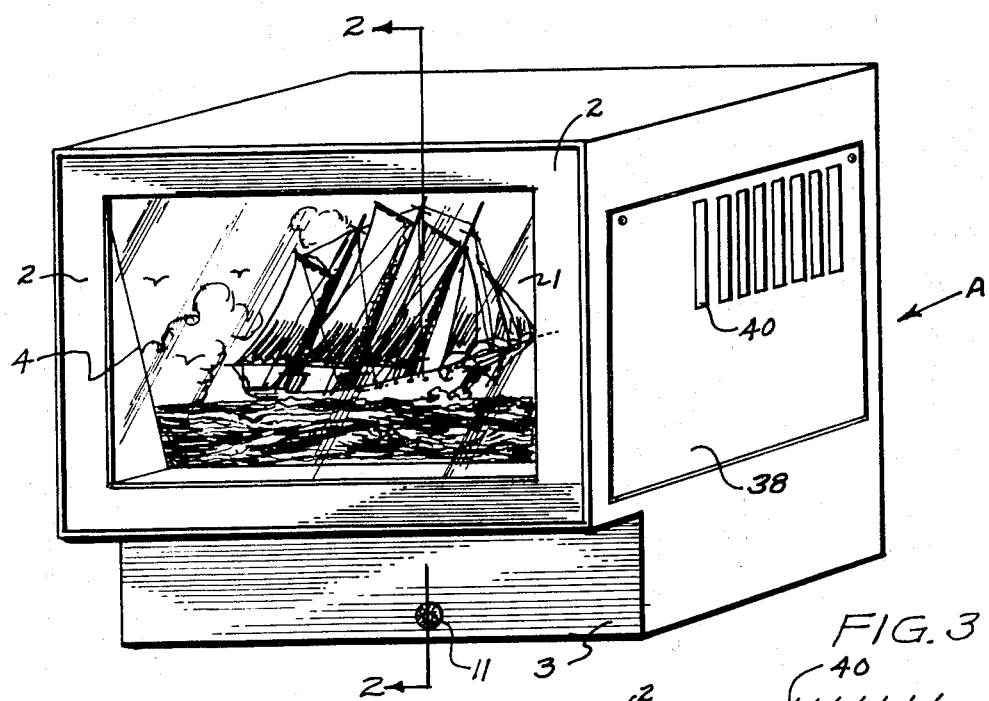
FIG. 1 is a perspective view in elevation of the apparatus illustrating the manner in which an image is reproduced on the screen.
Figure 2:
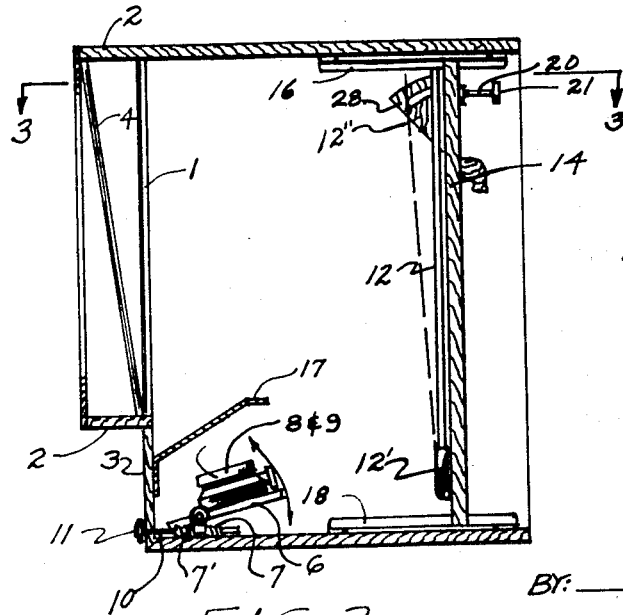
FIG. 2 is a sectional view taken on the line 2—2 of FIG. 1.
Figure 3:
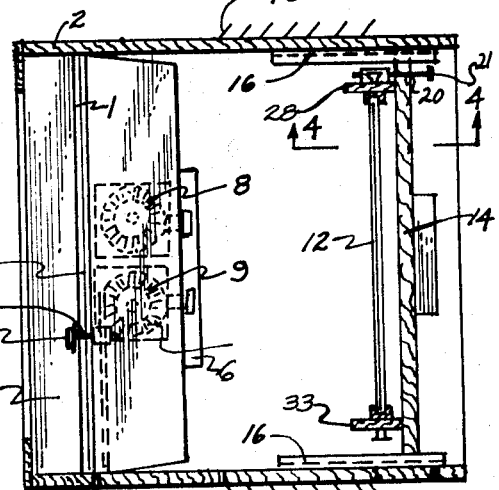
FIG. 3 is a sectional view taken on line 3—3 of FIG. 2.

Referring now in particular to FIGS. 1, 2 and 3 of the drawings, the cabinet is represented by the letter A. The major portion of one side of the cabinet extending downwardly from the top is provided with a transparent screen 1 on which an image may be reflected. Extending outwardly from and around the screen 1 is a portion of the cabinet or a separate part atached thereto in which is a light filter 4 which is inserted at an angle to the screen, the bottom being near the screen for removing the glare that may be reflected from the screen. Below the extended portion there is a closed portion 3 giving the impression of a step. Secured to a suitable portion within the cabinet adjacent the bottom is an adjustable shelf 6. The shelf 6 is adjustable horizontally by a worm gear arrangement, that is, a worm gear 7 engages a companion gear 8 which is fixedly attached to means which in turn is fixed to the shelf, whereby when the worm is rotated, the shelf is moved to change its horizontal relative position in the cabinet. Fixed to the worm is a stem 10 and a knob 11 for adjusting the shelf.

The shelf 6 is of such size and design as to accommodate two projection units 8 and 9; however, only one projector may be used if desirable.

The projection units may be of any suitable design for either slide or tape with or without sound.

Supported between the projection units and the screen is an opaque shield 17 to prevent any glare or light from the reproducing unit to be reflected upon the screen.

Figure 4:
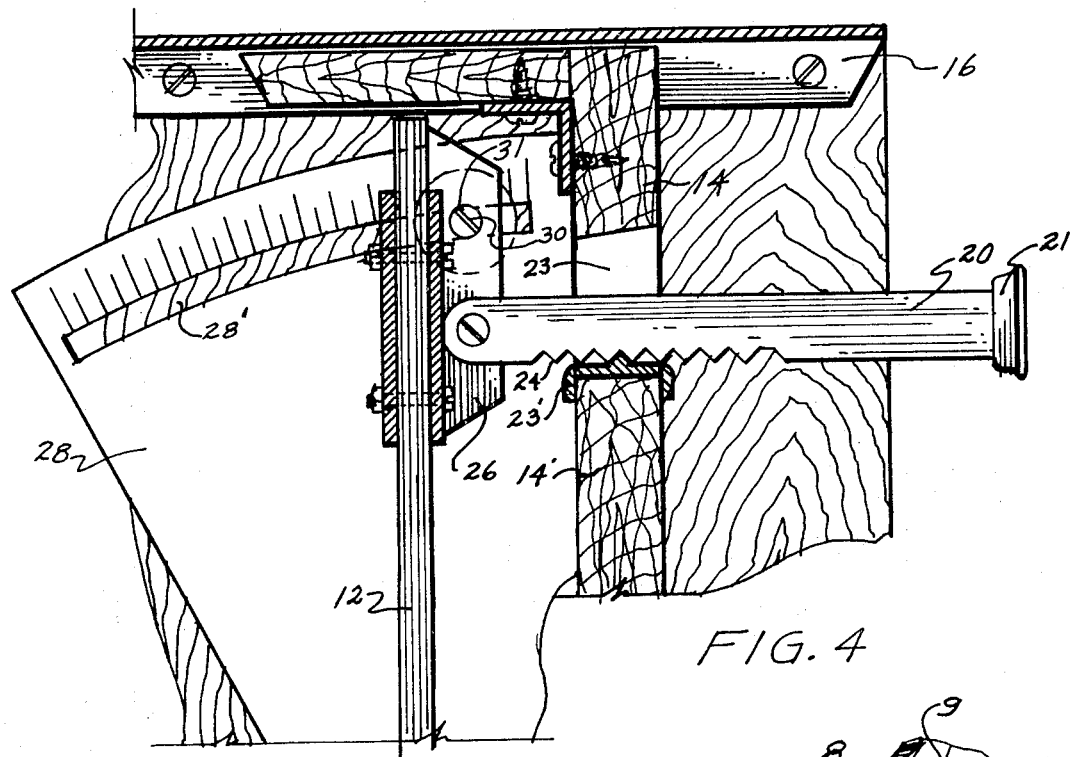
FIG. 4 is an enlarged fragmentary sectional view taken on the line 4—4 of FIG. 3 showing means for adjusting one of the elements of the apparatus.
Figure 6:
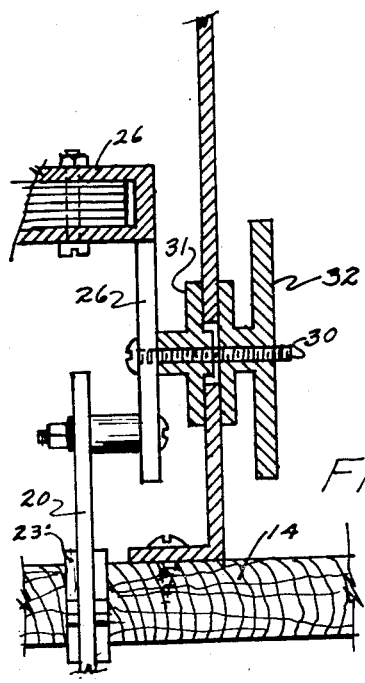
FIG. 6 is an enlarged view of one of the mirror holding means.

Within the cabinet is an adjustable mirror 12 carried by a horizontally adjustable panel 14 to which the lower end of the screen 1 is hingedly attached. The panel is adjustable horizontally along suitable tracks 16 and 18. The angle of the mirror is also vertically adjustable about the hinged end to the line 12'. The mirror adjusting means is best shown in FIG. 4. Referring now in particular to the mirror adjusting means, there is provided an arm 20 having knob 21 for manual adjusting of the mirror. The arm is provided with a toothed area 24 adjacent the lower side of the opening for positioning the arm relative to the panel. The inner end of the arm is hingedly connected to member 26 which in turn is fixed to the upper end of the mirror. Also fixed to the panel is a member 28 having an arcuated slot 28'. In practice the members 28 and 26 may be formed integrally. Referring particularly to FIG. 4, there is fixedly secured to the member 26 a threaded pin 30 and a sleeve adapted to engage the slot 28' and a threaded thumb screw 31, the thumb operated screw being adapted to be loosened on the pin to move the mirror and to fix the mirror in a selected position along the arcuated slot 28' and tighten to hold the mirror in selected position. This locking arrangement is provided for each upper end of the mirror as shown in FIG. 3. It may be pointed out that only one adjustable means is shown with the arm 20, however, the opposite mirror adjustable means 26 is a duplicate of the holding means 28 except for the adjustable arm 20.

Figure 5:
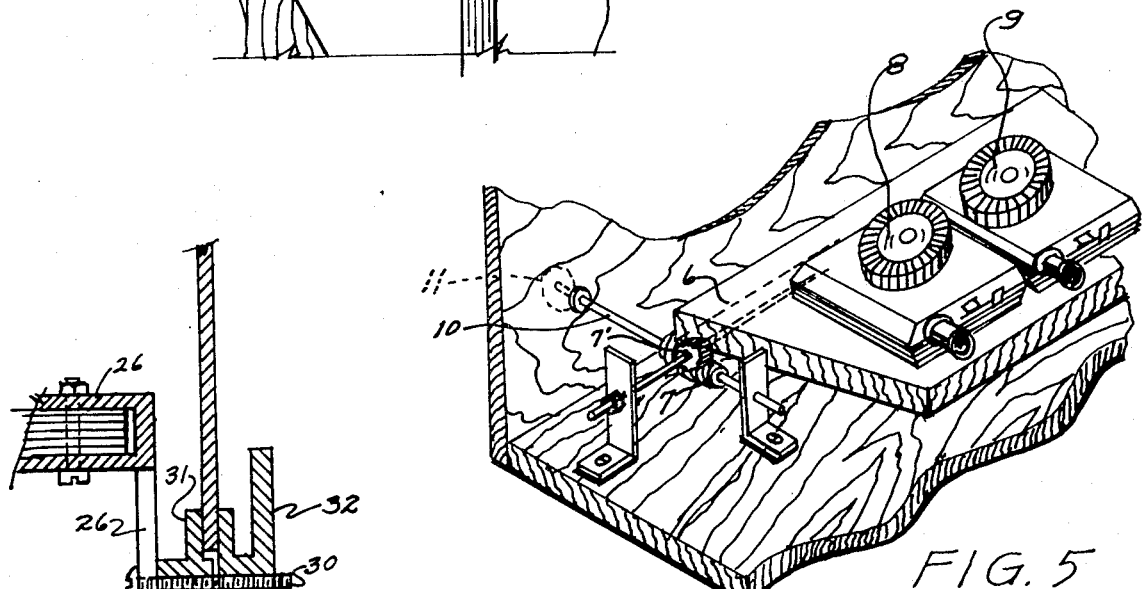
FIG. 5 is an enlarged fragmentary perspective view of another of the elements of the apparatus.

Referring in particular to FIG. 5, two image reproducing units are shown side by side on the shelf 6. Each of these units is positioned to throw the image on the mirror 1, which in turn reflects the image onto the screen 12 where it may be viewed. The adjusting of the reproducing units may be done by the knob 10' preferably from outside the cabinet. These units may be timed in their operation, that is, the time period in which the image stays on the screen. The units may also have means of controlling the intensity of the image and lowering the image on the screen wherein one image will be fading out on the screen while another image is being intensified, etc.; the units may be also automatically controlled as to the time the apparatus is to be operated including both beginning and ending.

The apparatus is constructed to give high efficient and economical operation. Its outside adjustments are for quick adjustments to all the necessary units for proper operation. The slide or tape may be easily removed through the door 38. In order to carry off the heat generated by the reproducing unit there are a series of louvers 40 along each side of the cabinet; however, any other type of ventilator may be used.

In operation, the side door 38 is removed and the reproducing units are placed on the shelf 6. It is to be understood that the reproducing unit may be of either slide or tape type. The table 6 is adjusted, if not already at the proper angle, so that the image is cast on the mirror 12. The mirror then reflects the image on the screen 1. If adjustment is necessary, the mirror is adjusted by the adjusting arm 20 as previously described, to obtain vertical position of the image on the screen. If the distance is to be adjusted between the mirror and screen, the panel may be moved along tracks 18 until in proper location. The reproducing units may then be set in motion through appropriate control means for controlling the length each image will be presented on the screen, including the starting and stopping of the viewing apparatus itself.

The invention is best defined in the appending claims.

I claim:
1. A viewing apparatus comprising:
   (a) a cabinet having a viewing screen in one wall thereof;
   (b) a shelf positioned in said cabinet adjacent and below the screen for supporting an image producing device;
   (c) said shelf being tiltable on a horizontal axis;
   (d) gearing means operatively associated with said shelf for tilting the same and having means extending outwardly of said cabinet for manual operation of said gearing means;
   (e) a mirror adjustably mounted within said cabinet on a wall thereof opposite the viewing screen; and
   (f) means extending outwardly of said cabinet for adjusting said mirror wherein the wall of the cabinet on which the said mirror is adjustably mounted is slidably mounted on tracks in said cabinet for horizontal adjustment toward and away from said screen.
2. The structure defined in claim 1 in which the adjustable mounting of the mirror on the wall opposite the viewing screen comprises a hinge between the lower edge of the mirror and said wall to allow tilting of said mirror on a horizontal axis and said means extending outwardly of said cabinet for adjusting said mirror includes means for holding said mirror in different positions of adjustment.

References Cited

UNITED STATES PATENTS

| | | | |
|---|---|---|---|
| 1,588,935 | 6/1926 | Brixey | 352—104 |
| 1,951,054 | 3/1934 | Kennedy | 353—79 |
| 2,174,778 | 10/1939 | Croft | 353—78 |
| 2,222,414 | 11/1940 | Kudar | 350—311X |
| 2,265,992 | 12/1941 | Beck | 353—78 |
| 2,703,507 | 3/1955 | Brown et al. | 353—72 |
| 3,078,343 | 2/1963 | Schulz et al. | 350—311X |
| 3,194,113 | 7/1965 | Knus | 353—75 |
| 3,472,588 | 10/1969 | Dine et al. | 353—78 |

FOREIGN PATENTS

| | | | |
|---|---|---|---|
| 10,330 | 11/1927 | Australia | 353—75 |
| 92,058 | 8/1968 | France | 353—78 |
| 686,738 | 1/1940 | Germany | 353—77 |

HARRY N. HAROIAN, Primary Examiner

U.S. Cl. X.R.

353—75, 97, 98